(12) United States Patent
Zhu

(10) Patent No.: US 9,227,283 B2
(45) Date of Patent: Jan. 5, 2016

(54) TOOL FOR CLAMPING USING END FACES OF WORKPIECES

(75) Inventor: Yanzhao Zhu, Zhejiang (CN)

(73) Assignee: ZHEJIANG LINIX MOTOR CO., LTD., Hengdian Electronic Industry Zone, Dongyang, Zhejiang (CN)

( * ) Notice: Subject to any disclaimer, the term of this patent is extended or adjusted under 35 U.S.C. 154(b) by 432 days.

(21) Appl. No.: 13/880,879

(22) PCT Filed: Jun. 4, 2012

(86) PCT No.: PCT/CN2012/076417
§ 371 (c)(1),
(2), (4) Date: Apr. 22, 2013

(87) PCT Pub. No.: WO2013/181779
PCT Pub. Date: Dec. 12, 2013

(65) Prior Publication Data
US 2014/0361477 A1   Dec. 11, 2014

(51) Int. Cl.
*B23Q 3/08* (2006.01)
*B23Q 3/06* (2006.01)

(52) U.S. Cl.
CPC ...................... *B23Q 3/062* (2013.01)

(58) Field of Classification Search
USPC .......................................................... 269/32
See application file for complete search history.

(56) References Cited

U.S. PATENT DOCUMENTS

| | | | | |
|---|---|---|---|---|
| 449,039 A * | 3/1891 | Fietsch, Jr. | ............... | B41F 27/04 101/385 |
| 744,559 A * | 11/1903 | Kendrick | ............. | B23Q 1/0063 144/278.1 |
| 2,587,025 A * | 2/1952 | Beck | ........................ | B23Q 3/06 101/386 |
| 4,804,171 A * | 2/1989 | Dornfeld | ................... | B25B 5/08 269/138 |
| 4,805,888 A * | 2/1989 | Bishop | ................. | B23Q 1/5468 269/235 |
| 4,915,367 A * | 4/1990 | Carossino | ................. | B25B 1/08 269/101 |
| 5,060,920 A * | 10/1991 | Engibarov | ............ | B25B 1/2452 269/282 |
| 5,094,436 A * | 3/1992 | Stephan, III | .............. | B25B 1/08 269/153 |
| 5,499,802 A * | 3/1996 | Haberle | ................. | B23Q 3/102 269/235 |
| 6,530,302 B1 * | 3/2003 | Rogers | ................. | B23Q 16/001 144/136.95 |
| 6,585,244 B2 * | 7/2003 | Goeckel | ................. | B23Q 1/032 269/21 |
| 8,104,754 B1 * | 1/2012 | Clark | ....................... | B25B 5/006 269/289 R |
| 2007/0057135 A1* | 3/2007 | Hanaoka | ............... | B23Q 7/1431 248/316.1 |
| 2014/0284860 A1* | 9/2014 | Chen | ....................... | B23Q 3/062 269/47 |

* cited by examiner

*Primary Examiner* — Lee D Wilson
*Assistant Examiner* — Alvin Grant
(74) *Attorney, Agent, or Firm* — Global IP Services; Tianhua Gu

(57) ABSTRACT

A tool for clamping using end surfaces of box workpieces, comprises a soleplate and an upper template. A tightening cylinder has a piston rod connected with a top plate, and the top plate and the piston rods are in swinging connection. Three protrusions are arranged on the upper surface of the top plate and distributed in a triangle shape. A rotating shaft is arranged beside a position of the upper template, the upper end of the rotating shaft is provided with a hand wheel capable of driving the rotating shaft to rotate, the rotating shaft is sleeved with a compression spring on the portion between the hand wheel and the upper surface of the upper template, and the lower end of the rotating shaft is fixed with one end of a transverse support rod which is linked with the rotating shaft.

8 Claims, 3 Drawing Sheets

TOOL FOR CLAMPING USING END FACES OF WORKPIECES

TECHNICAL FIELD OF THE INVENTION

The invention relates to a tool for clamping using end faces of workpieces, in particular to a tool for clamping box workpieces using end faces of the box workpieces.

BACKGROUND OF THE INVENTION

When machining fitting surfaces of box workpieces, the box workpieces need to be clamped and fixed using the end faces of the box workpieces. As the end surfaces of the box workpieces are often uneven, it is difficult in using the existing tools to clamp and fix the box workpieces by using the end surfaces of the box workpieces, thus making the machining of the fitting surfaces of the box workpieces difficult.

SUMMARY OF THE INVENTION

The invention provides a tool for clamping using end surfaces of workpieces, which is convenient in clamping and fixing box workpieces using end surfaces thereof to machine fitting surfaces of the box workpieces, and solves the problems in the prior art.

The following technical solution is employed in the invention to accomplish the above technical purpose. The tool for clamping using end surfaces of workpieces comprises a soleplate and an upper template. Upright posts are supported between the soleplate and the upper template. The upper template is provided with die holes, the inner edge of each die hole is provided with at least two inward bulges, and step-shaped through holes having big top and small bottom are arranged on each inward bulge. A tightening cylinder is arranged at a position of the soleplate correspondingly below the die holes, the piston rod of the tightening cylinder is connected with a top plate, and the top plate and the piston rods are in swinging connection. Three protrusions are arranged on the upper surface of the top plate and distributed in a triangle shape. A rotating shaft is arranged beside a position of the upper template corresponding to each die hole, the rotating shaft penetrates the upper template from the top down, the upper end of the rotating shaft is provided with a hand wheel capable of driving the rotating shaft to rotate, the rotating shaft is sleeved with a compression spring on the portion between the hand wheel and the upper surface of the upper template, and the lower end of the rotating shaft is fixed with one end of a transverse support rod which is linked with the rotating shaft. During clamping, a reduction box workpiece is placed into the tool for clamping from the lower portion of the upper template to align the holes on the fitting surface of the reduction box workpiece with the step-shaped through holes on the inward bulge on the inner edge of each die hole, plug pins are inserted into the step-shaped through holes to fit with the holes on the fitting surface of the reduction box workpiece, in this way, the reduction box workpiece is located in the axial direction; then, an operator holds the reduction box workpiece by one hand, and presses the hand wheel downward and rotates the hand wheel by a definite angle by the other hand to rotate the transverse support rod below the end face of the reduction box workpiece, and then releases the hand wheel; the hand wheel is pushed upward by the compression spring and the transverse support rod is pulled upward by the rotating shaft so as to support the reduction box workpiece, at this time, the operator releases his hands to start the tightening cylinder, and the piston rod of the tightening cylinder pushes the top plate upward, as the top plate and the piston rods are in swinging connection, the three protrusions on the top plate can self-adapt to the uneven end face of the box workpiece, so all the three protrusions may be in contact with the end face of the box workpiece, as a result, the box workpiece is tightened and fixed below the die holes, and both the fitting surface and the cavity of the box workpiece are exposed from the die holes, being conducive to machining. The invention effectively solves the problem of difficulty in clamping box workpieces due to unevenness of the end faces of the box workpieces. After the machining is completed, the tightening cylinder returns back, the operator holds the box workpiece again by one hand, and presses the hand wheel downward and rotates the hand wheel by the other hand to move the transverse support rod away from the lower portion of the box workpiece, and then, the machined box workpiece can be moved away.

Preferably, the hand wheel consists of an upper disc and a lower column, the outer diameter of the upper disc is larger than that of the lower column, a notch is formed on the periphery of the upper disc, and a limiting pin, which can be fitted inside the notch of the upper disc for restricting the rotation of the hand wheel, is arranged on the upper template. When the limiting pin is inside the notch of the disc of the hand wheel, the hand wheel is unable to rotate, in this state, the transverse support rod is located below the die holes, that is, in the state of capable of holding the box workpiece, so that the position of the transverse support rod is restricted; when in idle state, the hand wheel is lifted and rotated to make the upper ends of the limiting pin against the lower surface of the upper disc of the hand wheel, keeping the transverse support rod deviating from the die holes, thus preventing the transverse support rod from swinging.

Preferably, a shallow groove is formed between two ends of the transverse support rod, being convenient for restricting the position of the box workpieces in the horizontal direction, thus avoiding the horizontal movement of the box workpieces and being convenient for operation.

Preferably, the tightening cylinder is provided with three parallel piston rods, the three piston rods are connected together through a connecting block, and the top plate is hinged with the upper surface of the connecting block. The tightening cylinder is connected with the top plate through the three piston rods, thus guaranteeing the vertical lifting and falling of the connecting block connected with the top plate and the uniform stress of each portion of the connecting block, so that the reliability and stability of the box workpieces during machining are ensured.

Preferably, the upper template is provided with multiple die holes arranged at interval, and each die hole corresponds to the tightening cylinder, the top plate, the rotating shaft, the hand wheel and the transverse support rod, so the tool for clamping can clamp and fix multiple box workpieces at one time, therefore both the use rate and the machining efficiency of the tool for clamping are improved.

Hence, the invention has the advantage of being convenient in clamping and fixing box workpieces using end surfaces thereof to machine fitting surfaces of the box workpieces.

DETAILED DESCRIPTION OF THE INVENTION

The technical solution of the invention will be further described in details as below by specific embodiments and with reference to drawings.

Embodiments

Figure 1:
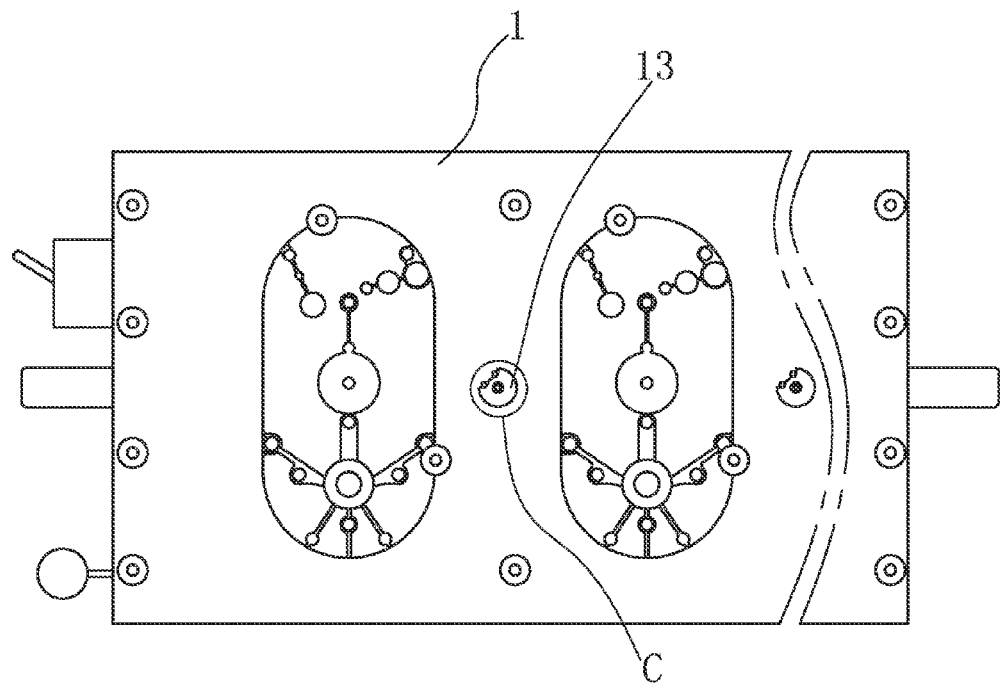
FIG. 1 is a top structure diagram of the invention.
Figure 2:
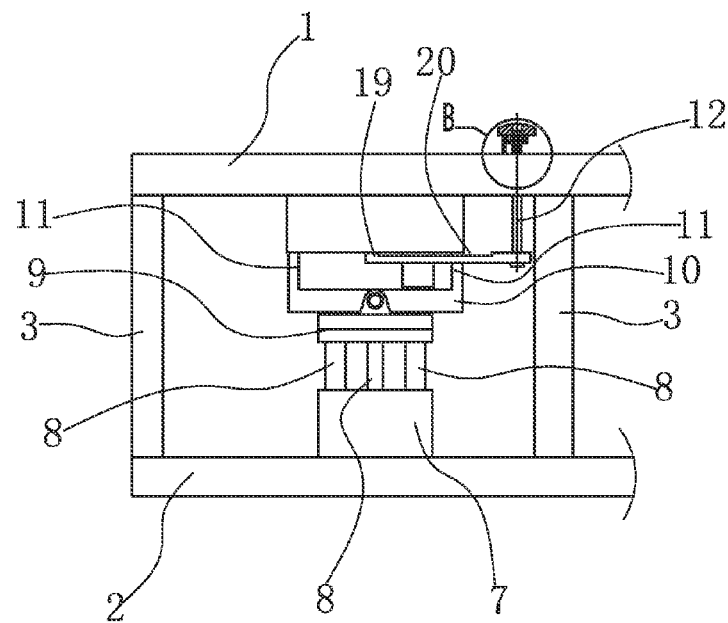
FIG. 2 is a front structure diagram with a partial section of the invention.
Figure 3:
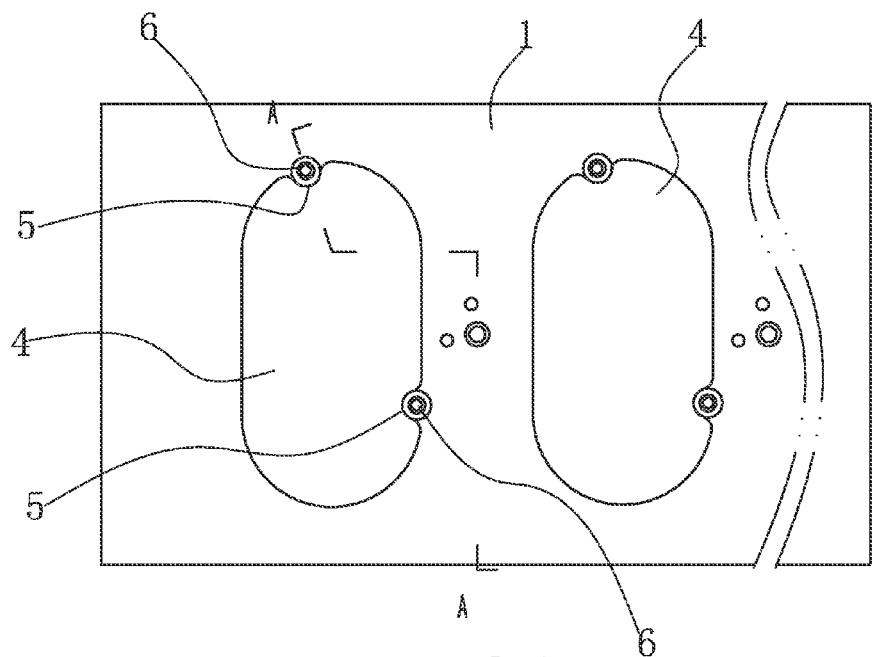
FIG. 3 is a structure diagram of a template of the invention.
Figure 4:
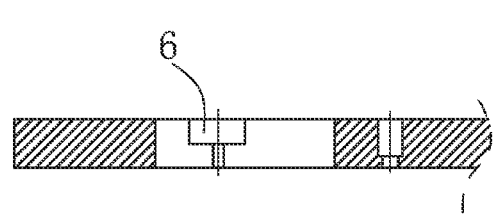
FIG. 4 is a sectional view of FIG. 3 along line A-A.
Figure 5:
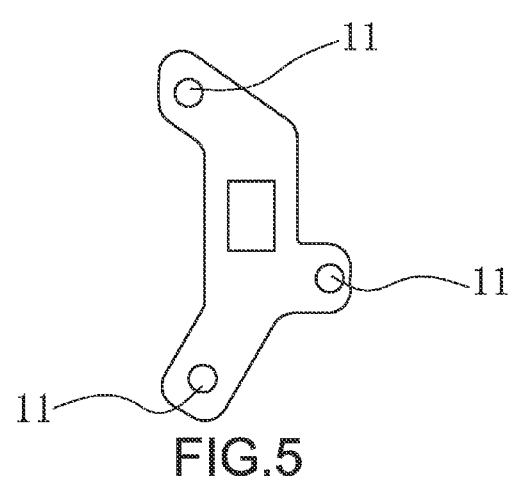
FIG. 5 is a top structure diagram of a top plate of the invention.
Figure 6:
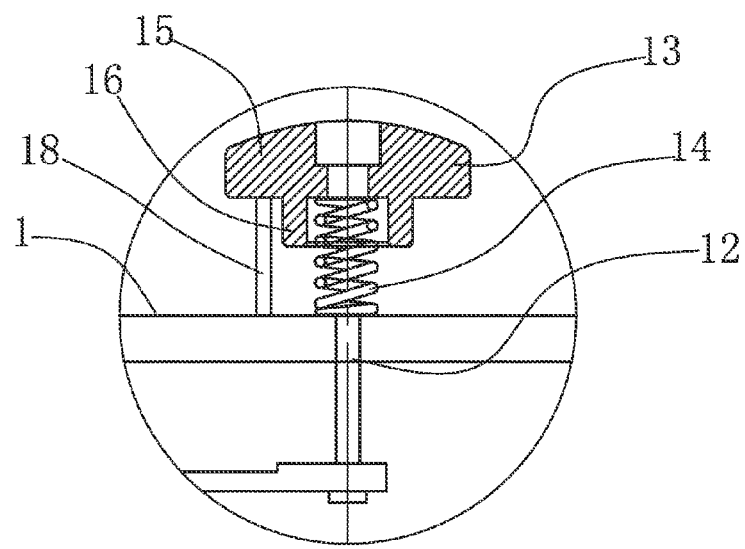
FIG. 6 is an enlarged diagram of portion B of FIG. 2.
Figure 7:
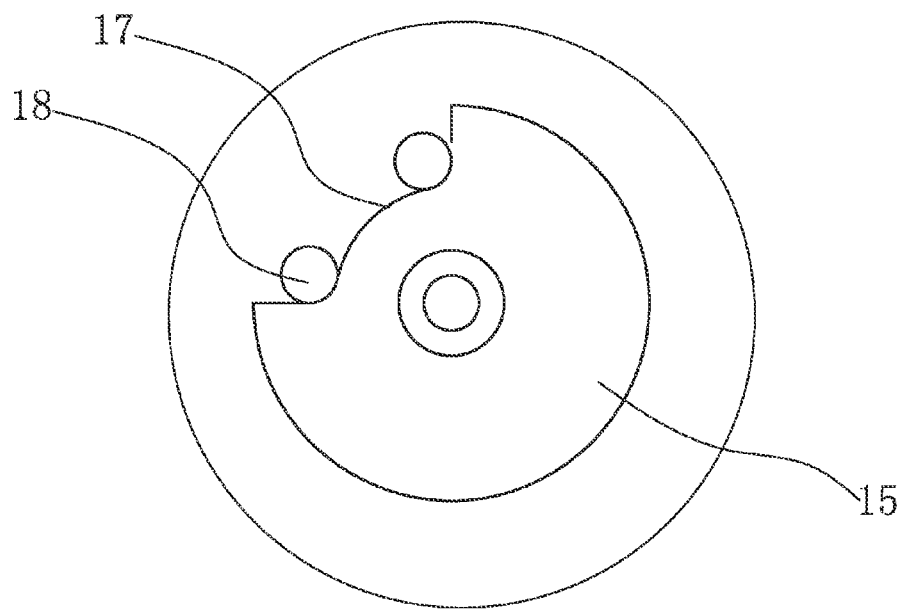
FIG. 7 is an enlarged view of portion C of FIG. 1.

As shown in FIG. 1 and FIG. 2, the tool for clamping using end surfaces of workpieces comprises an upper template 1 and a soleplate 2, multiple upright posts 3 are supported between the upper template 1 and the soleplate 2. As shown in FIG. 2 and FIG. 3, the upper template 1 is provided with multiple die holes 4 arranged at interval, the inner edge of each die hole is provided with two inward bulges 5, and step-shaped through holes 6 having big top and small bottom are arranged on each inward bulge 5. As shown in FIG. 2, a tightening cylinder 7 is arranged at a position of the soleplate 2 correspondingly below the die holes, each tightening cylinder 7 is provided with three parallel piston rods 8, the three piston rods 8 are connected together through a connecting block 9, and a top plate 10 is hinged with the upper surface of the connecting block, thus realizing swinging connection with the piston rods. As shown in FIG. 2 and FIG. 5, three protrusions 11 are arranged on the upper surface of the top plate 10 and distributed in a triangle shape. As shown in FIG. 2, a rotating shaft 12 is arranged beside a position of the upper template 1 corresponding to each die hole, and the rotating shaft 12 penetrates the upper template 1 from the top down. As shown in FIG. 6, the upper end of the rotating shaft 12 is provided with a hand wheel 13 capable of driving the rotating shaft 12 to rotate, and the rotating shaft 12 is sleeved with a compression spring 14 arranged at the portion between the hand wheel 13 and the upper surface of the upper template 1; and the hand wheel 13 consists of an upper disc 15 and a lower column 16, and the outer diameter of the upper disc 15 is larger than that of the lower column 16. As shown in FIG. 7, a notch 17 is formed on the periphery of the upper disc 15. As shown in FIG. 6 and FIG. 7, a limiting pin 18, which can be fitted inside the notch 17 of the upper disc for restricting the rotation of the hand wheel, is arranged on the upper template 1. As shown in FIG. 2, the lower end of the rotating shaft 13 is fixed with one end of a transverse support rod 19 which is linked with the rotating shaft 13, and a shallow groove 20 is formed between two ends of the transverse support rod 19.

When the limiting pin is inside the notch of the upper disc of the hand wheel, the hand wheel is unable to rotate, in this state, the transverse support rod is located below the die holes, that is, the hand wheel is in the state of capable of holding the box workpiece, so that the position of the transverse support rod is restricted; when in idle state, the hand wheel is lifted and rotated to make the upper ends of the limiting pins be against the lower surface of the upper disc of the hand wheel, keeping the transverse support rod deviating from the die holes, thus preventing the transverse support rod from swinging. During clamping, a reduction box workpiece is placed into the tool for clamping from the lower portion of the upper template to align the holes on the fitting surface of the reduction box workpiece with the step-shaped through holes on the inward bulge on the inner edge of each die hole, plug pins are inserted into the step-shaped through holes to fit with the holes on the fitting surface of the reduction box workpiece, in this way, the reduction box workpiece is located in the axial direction; then, an operator holds the reduction box workpiece by one hand, and presses the hand wheel downward and rotates the hand wheel by a definite angle by the other hand to rotate the transverse support rod below the end face of the reduction box workpiece, and then releases the hand wheel; the hand wheel is pushed upward by the compression spring and the transverse support rod is pulled upward by the rotating shaft so as to support the reduction box workpiece, at this time, the operator releases his hands to start the tightening cylinder, and the piston rod of the tightening cylinder pushes the top plate upward, as the top plate and the piston rods are in swinging connection, the three protrusions on the top plate can self-adapt to the uneven end faces of the box workpieces, so all the three protrusions may be in contact with the end faces of the box workpieces, as a result, the box workpiece is tightened and fixed below the die holes, and both the fitting surface and the cavity of the box workpiece are exposed from the die holes, being conducive to machining. The invention effectively solves the problem of difficulty in clamping box workpieces due to unevenness of the end faces of the box workpieces. After the machining is completed, the tightening cylinder returns back, the operator holds the box workpiece again by one hand, and presses the hand wheel downward and rotates the hand wheel by the other hand to move the transverse support rod away from the lower portion of the box workpiece, and then, the machined box workpiece can be moved away.

What is claimed is:

1. A tool for clamping using end surfaces of workpieces, comprising a soleplate and an upper template, upright posts being supported between the soleplate and the upper template, the upper template being provided with die holes, the inner edge of each die hole being provided with at least two inward bulges, and step-shaped through holes having big top and small bottom being arranged on each inward bulge; a tightening cylinder being arranged at a position of the soleplate correspondingly below the die holes, the piston rod of the tightening cylinder being connected with a top plate, and the top plate and the piston rods being in swinging connection; and three protrusions being arranged on the upper surface of the top plate and distributed in a triangle shape; a rotating shaft being arranged beside a position of the upper template corresponding to each die hole, the rotating shaft penetrating the upper template from the top down, the upper end of the rotating shaft being provided with a hand wheel capable of driving the rotating shaft to rotate, the rotating shaft being sleeved with a compression spring on the portion between the hand wheel and the upper surface of the upper template, and the lower end of the rotating shaft being fixed with one end of a transverse support rod which is linked with the rotating shaft.

2. The tool for clamping using end surfaces of workpieces according to claim 1, wherein the hand wheel consists of an upper disc and a lower column, the outer diameter of the upper disc is larger than that of the lower column, a notch is formed on the periphery of the upper disc, and a limiting pin, which can be fitted inside the notch of the upper disc for restricting the rotation of the hand wheel, is arranged on the upper template.

3. The tool for clamping using end surfaces of workpieces according to claim 1, wherein a shallow groove is formed between two ends of the transverse support rod.

4. The tool for clamping using end surfaces of workpieces according to claim 1, wherein the tightening cylinder is provided with three parallel piston rods, the three piston rods are connected together through a connecting block, and the top plate is hinged with the upper surface of the connecting block.

5. The tool for clamping using end surfaces of workpieces according to claim 1, wherein the upper template is provided with multiple die holes arranged at interval, and each die hole corresponds to the tightening cylinder, the top plate, the rotating shaft, the hand wheel and the transverse support rod.

6. The tool for clamping using end surfaces of workpieces according to claim 2, wherein a shallow groove is formed between two ends of the transverse support rod.

7. The tool for clamping using end surfaces of workpieces according to claim 2, wherein the tightening cylinder is provided with three parallel piston rods, the three piston rods are connected together through a connecting block, and the top plate is hinged with the upper surface of the connecting block.

8. The tool for clamping using end surfaces of workpieces according to claim 2, wherein the upper template is provided with multiple die holes arranged at interval, and each die hole corresponds to the tightening cylinder, the top plate, the rotating shaft, the hand wheel and the transverse support rod.

* * * * *